United States Patent [19]

Kayanoki et al.

[11] Patent Number: 4,650,053
[45] Date of Patent: Mar. 17, 1987

[54] SPRING TYPE CLUTCH DISC

[75] Inventors: Katsuhiko Kayanoki; Kazuo Teramachi; Seigo Ono, all of Kyoto; Yasuyuki Hashimoto, Katano, all of Japan

[73] Assignee: Mitsubishi Jidosha Kogyo Kabushiki Kaisha, Tokyo, Japan

[21] Appl. No.: 719,004
[22] PCT Filed: Aug. 8, 1984
[86] PCT No.: PCT/JP84/00397
§ 371 Date: Apr. 1, 1985
§ 102(e) Date: Apr. 1, 1985
[87] PCT Pub. No.: WO85/00858
PCT Pub. Date: Feb. 28, 1985

[30] Foreign Application Priority Data

Aug. 10, 1983 [JP] Japan ............................. 58-146064
Aug. 1, 1984 [JP] Japan ............................. 59-162208

[51] Int. Cl.$^4$ ........................... F16D 3/14; F16D 3/66
[52] U.S. Cl. ............................ 192/106.2; 192/106.1; 464/68
[58] Field of Search ............. 192/106.2, 106.1, 70.17; 427/305; 464/64, 68; 384/907, 912; 308/DIG. 8

[56] References Cited

U.S. PATENT DOCUMENTS

| 3,867,176 | 2/1975 | Dalton et al. | 427/305 |
| 4,239,789 | 12/1980 | Blum et al. | 427/305 X |
| 4,560,054 | 12/1985 | Kayanoki et al. | 192/106.2 |
| 4,577,743 | 3/1986 | Raab et al. | 192/106.2 |
| 4,585,428 | 4/1986 | Asada | 464/68 |

Primary Examiner—Rodney H. Bonck
Assistant Examiner—Richard M. Lorence
Attorney, Agent, or Firm—Oldham, Oldham & Weber Co.

[57] ABSTRACT

In a spring type clutch disc, torque is transmitted from a disc plate (2) to a hub (3) through coil springs (12, 13). A slide member (11b, 14) making sliding contact with the hub (3) is interposed between the disc plate (2) and the hub (3). An electroless plate Ni coating is provided on one of the slide member (11b, 14) and the hub (3), while an electroless plate Ni-P-BN coating is provided on the other, so as to stabilize the coefficient of friction of and improve the wear resistance of the slidingly frictional engaging portion therebetween, whereby the first-stage hysteresis torque in the torsional characteristic of the clutch disc is stably maintained at a minimum.

6 Claims, 4 Drawing Figures

SPRING TYPE CLUTCH DISC

TECHNICAL FIELD

This invention relates to a spring type clutch disc of a friction clutch for an automobile.

BACKGROUND ART

A clutch is provided in automobiles for interrupting transmission of the output of an engine during a shift between gear ratios of a gear transmission, and a friction clutch is most widely employed by virtue of the simple construction and the ease of maintenance. Although the friction clutch is classified into a variety of types, its basic construction is such that a release bearing is urged toward a flywheel by the clutch pedal so that a clutch disc normally pressed against the flywheel by the force of a spring can be urged away from the flywheel against the force of the spring. The clutch disc is classified into a solid type and a spring type. The spring type comprises coil springs interposed between a hub splined to the input shaft of the gear transmission and disc plates holding a friction plate making pressure engagement with the flywheel, so as to transmit torque therethrough, and is, therefore, advantageous in that a shock absorbing action is effected during engagement of the clutch.

By the way, when the engine is in its idling condition, that is, when the gear position in the transmission is neutral, "clattering" or "rattling" noise is frequently generated from the transmission. This is because, in the idling condition, a large torque variation occurs in the engine, which variation is especially marked in the case of a Diesel engine, and the resultant collision of the gears of the transmission with each other gives rise to generation of meshing noise. A structure having a special torsional characteristic is known in which, for the purpose of preventing such meshing noise, a friction washer is interposed between the disc plates and the hub so as to absorb the noise by the clutch disc. FIG. 1 shows an example of the torsional characteristic of the structure having such a function. The noise occurring during idling has concern with a first-stage hysteresis torque indicated by the symbol $H_1$, and, for the purpose of preventing the noise, it is necessary to maintain this $H_1$ at a certain small value suitable for the engine/transmission torsional vibration system. To this end, the co-applicant of the present application has proposed the technique of reducing the surface pressure between the disc plates and the hub and providing a plated coating for stabilizing the coefficient of friction of and improving the wear resistance of these frictional portions, in Japanese Utility Model Application No. 56-161633 laid open already as Japanese Utility Model Laid-open No. 58-67124. However, depending on the engine, this hysteresis torque $H_1$ must be set at a very small value of the order of 0.05–0.12 kgm to avoid trouble. This is because, when the value of this hysteresis torque $H_1$ becomes smaller than 0.05 kgm in use, the clutch disc itself makes a torsional resonance thereby generating great noise, while, when this value becomes larger than 0.12 kgm, the effect of preventing noise generated from the transmission is abruptly reduced.

DISCLOSURE OF THE INVENTION

The object of the present invention is, therefore, to provide an improved spring type clutch disc in which the first-stage hysteresis torque in the torsional characteristic of the clutch disc can be stably maintained at a very small value over a long period of time, so that the clutch disc can deal with engines of whatever kind.

The present invention which attains the above object provides a spring type clutch disc including a hub having flanges at the middle portion of its outer periphery, disc plates sandwiching the flanges of the hub therebetween, and a slide member interposed between the disc plates and the hub to make sliding contact with the hub, the torque transmission from the disc plates to the hub being effected through coil springs interposed therebetween, characterized in that an electroless plated Ni coating is provided on either one of the slide member and the hub, while an electroless plated Ni-P-BN coating is provided on the other.

BEST MODE FOR CARRYING OUT THE INVENTION

The present invention will now be described with reference to the accompanying drawings.

Figure 3:
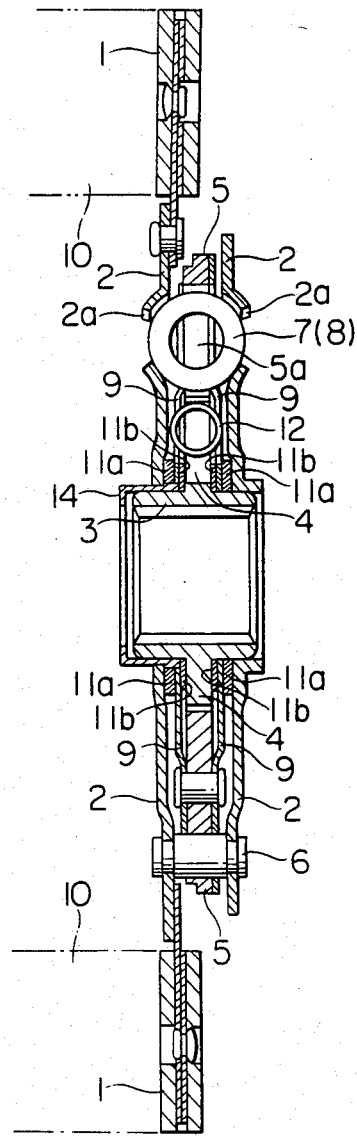
FIG. 3 is a longitudinal sectional view taken along the line III—III in FIG. 2.
Figure 2:
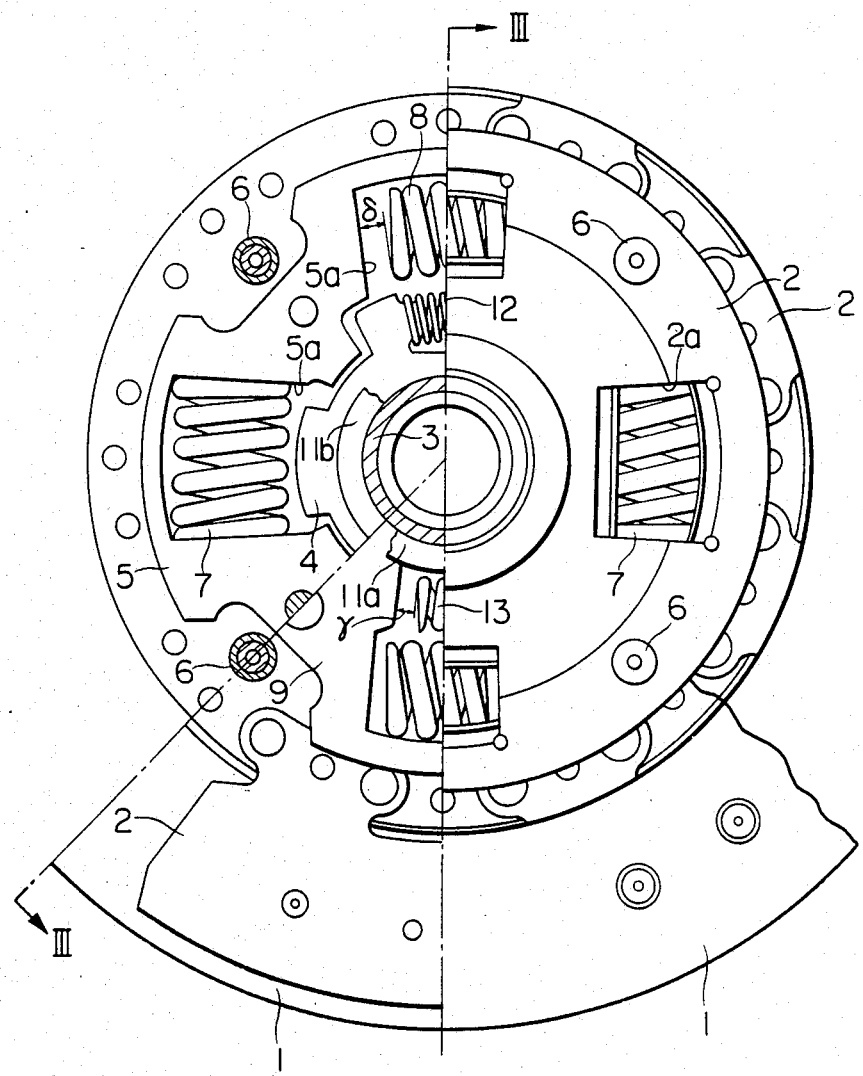
FIG. 2 is a partly sectional, front elevation view showing one form of a clutch disc to which the present invention is applied.

FIG. 2 is a partly sectional, front elevation view of one form of a clutch disc to which the present invention is applied, and this is substantially the same as the drawing attached to the specification of aforementioned Japanese Utility Model Application No. 56-161633. FIG. 3 is a longitudinal sectional view taken along the line III—III in FIG. 2. A friction plate, that is, a facing 1 that can be pressed against a flywheel 10 of an engine is secured to one of two disc plates 2, and a hub 3 splined to an input shaft of a transmission is rotatably fitted at its outer peripheral surface in central hub-receiving bores of the respective disc plates 2. Flanges 4 of different shapes forming pairs in the radially outward direction protrude at four positions from the middle portion of the outer peripheral surface of the hub 3, and, at the radially outer side thereof, a torque plate 5 having cutouts 5a engageable with the respective flanges 4 is located between the two disc plates 2 coupled by pins 6. The two disc plates 2 engage the torque plate 5 through torque-transmitting coil springs 7 and 8 inserted circumferentially into the cutouts 5a of the torque plate 5 and cutouts 2a of the disc plates 2. Each coil spring 8 has a clearance $\delta$ in the circumferential direction between it and the torque plate 5. The torque plate 5 is sandwiched at its both sides between friction plates 9 having substantially the same shape as that of the torque plate, and the friction plates 9 engage the hub flanges 4 through shock-absorbing coil springs 12 and 13 disposed similarly in the circumferential direction therebetween. The coil spring 13 has a clearance Y in the circumferential direction between it and the friction plates 9. The friction plates 9 make pressure engagement at the central outer surface thereof with the disc plates 2 through friction washers 11a having a large coefficient of friction and at the central inner surface thereof with the hub flanges 4 through other friction washers 11b having a small coefficient of friction. The outer periphery of the hub 3 nearer to the flywheel 10 relative to the hub flanges 4 is rotatably fitted in a bush 14 press-fitted at the side nearer to the flywheel 10 on the disc plate 2, the outer friction washer 11a and the friction plate 9. Such a bush 14 may also be provided on the outer periphery of the boss 3 at the side remote from the flywheel 10.

When the engine is under a light-loaded condition such as idling, the torque of the engine is transmitted from the flywheel 10 to the hub 3 through the friction plates 1, disc plates 2, torque springs 7, torque plate 5, friction plates 9, friction washers 11b and hub flanges 4 in the order above described. With a progressive increase in the load of the engine, the first cushion spring 12 is first compressed by an amount corresponding to the clearance Y of the second cushion spring 13, the second cushion spring 13 is then compressed, the first torque springs 7 are subsequently compressed by an amount corresponding to the clearance δ of the second torque springs 8, and the second torque springs 8 are then compressed, thereby transmitting the torque while absorbing the shock.

Figure 1:
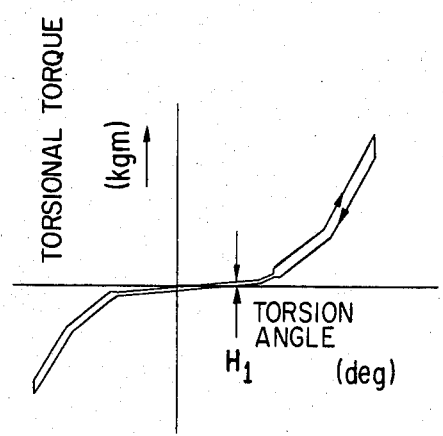
FIG. 1 is a graph showing a preferred torsional characteristic demanded for a clutch disc.

As described hereinbefore, the first-stage hysteresis torque in the torque characteristic of the clutch disc is required to be maintained at a very small value as shown by $H_1$ in FIG. 1, in order to prevent meshing noise generated from the gear transmission during idling of the engine. In the present invention, this value is obtained by providing a special plated coating on at least the slidingly frictional engaging portions of the hub 3 (including the hub flanges 4: the same applies to the later description too), inner friction washer 11b and bush 14.

An embodiment of the present invention will now be described in which an electroless plated nickel (Ni)-phosphorus (P) coating is provided on the hub 3 as an electroless plated nickel (Ni) coating, and an electroless plated nickel (Ni)-phosphorus (P)-boron nitride (BN) coating is provided on the friction washer 11b and bush 14.

The electroless plated Ni-P coating and the electroless plated Ni-P-BN coating are provided according to a known process, and its conditions are shown in Table 1. The thickness and hardness of the plated coatings are also shown in Table 1.

TABLE 1

| Plating conditions | Parts | |
|---|---|---|
| | Hub | Bush, friction washer |
| Plating bath composition | Ni—P | Ni—P—BN |
| Plating bath pH | 4.5 | 5.0 |
| Bath temperature | 91° C. | 86° C. |
| Immersion time | 20 min | 45 min |
| Baking time | 1 hr | 1 hr |
| Baking temperature | 300° C. | 500° C. |
| Coating composition | Ni - 91 wt % | Ni - 90 wt % |
| | P - 9 wt % | P - 6 wt % |
| | | BN - 4 wt % |
| Thickness | 7 μm | 12 μm |
| Hardness | Hmv 800 | Hmv 800 |

Figure 4:
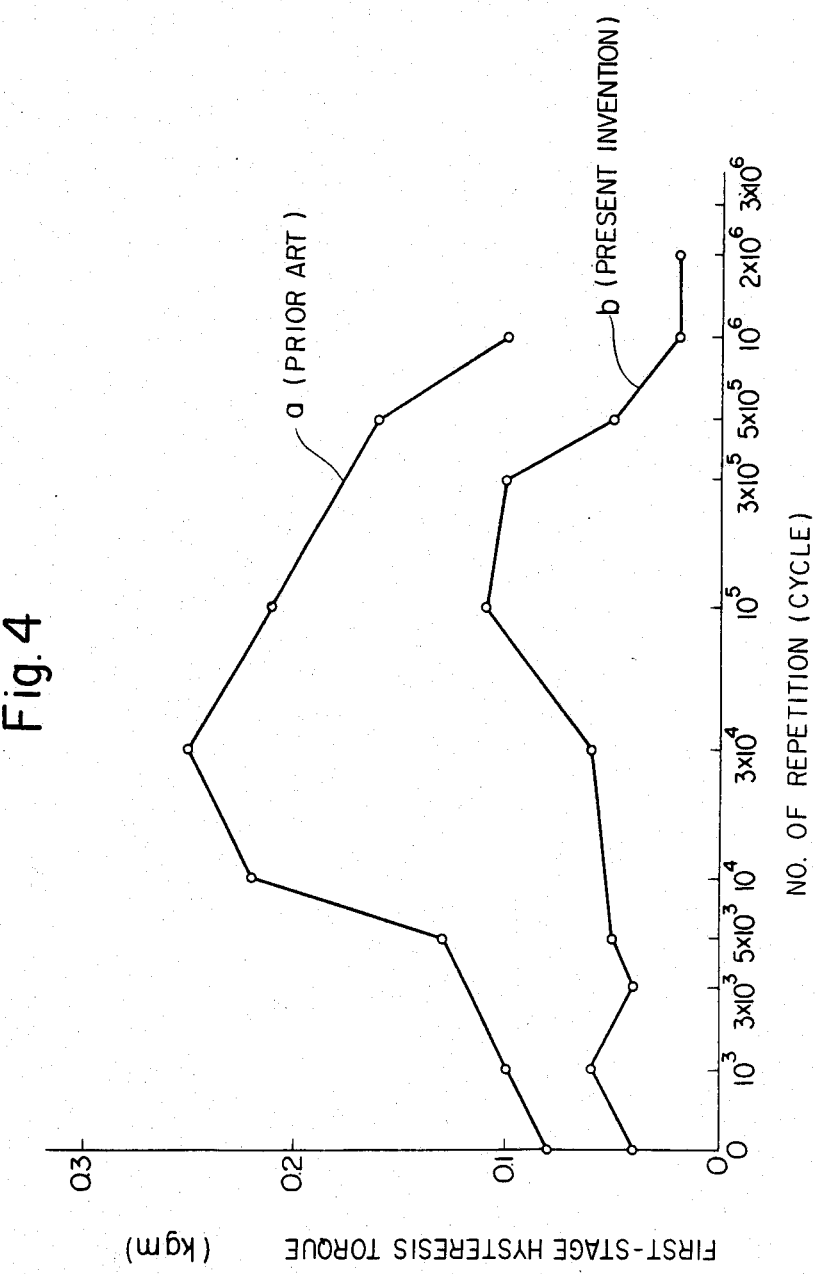
FIG. 4 is a graph showing the first-stage hysteresis torque according to an on-stand torsional endurance test.

The change of the first-stage hysteresis torque when the clutch disc including the hub 3, friction washer 11b and bush 14 having the plated coatings provided under the above conditions was subjected to an on-stand torsional endurance test, is shown in FIG. 4. It will be apparent from the test results shown in FIG. 4 that, when the curve a showing a prior art structure having a plated nickel-teflon composite coating provided on the bush and friction washer is compared with the curve b showing the structure having the electroless plated Ni-P-BN coating provided according to the present invention, the first-stage hysteresis torque can be maintained at a small value, and the durability of maintaining a low coefficient of friction is excellent in the clutch disc structure of the present invention.

The thickness and hardness of the plated coatings are so determined as to minimize the change of the first-stage hysteresis torque taking into consideration the factors including the load imparted to the slidingly engaging portions, the number of durable uses and the materials of the mating members. However, since the thickness and hardness of the plated coatings vary delicately depending on the duration of immersion in the plating bath, the duration of heat treatment and the temperature of heat treatment, it is difficult to make production management. Therefore, considering the fluctuation of the quality of products, it is desirable that the thickness of the electroless plated Ni-P coating is selected to lie within the range of 4-10 μm, the thickness of the electroless plated Ni-P-BN coating is selected to lie within the range of 10-16 μm, and the hardness of both the coatings is selected to lie within the range of Hmv 700-900. When the plated coating thicknesses deviate from the above ranges and are smaller than the above values, the amount of wear at the portions having the plated coatings increases resulting in an insufficient durability. Excessively thick plated coatings are disadvantageous from the aspect of the cost. Also, an insufficient hardness of the coatings increases the amount of wear resulting in the lack of durability. An excessively large hardness of the coatings tends to cause an earlier wear of the mating members and to make the coatings brittle to give rise to the lack of durability.

The plated coating composition providing the electroless plated Ni-P coating shown in Table 1 contains 9% by weight of P. However, since the hardness changes depending on the content of P, it is preferable that the composition contains 8-10% by weight of P, considering the durability and fluctuation of the quality of products. Similarly, in the case of the electroless plated Ni-P-BN coating too, the hardness changes depending on the content of P. A large content of P results in hardness and brittleness and also causes wear of the mating members, while a small content of P results in softness. Therefore, it is preferable that the composition contains 5-8% by weight of P. Further, although a large content of BN improves the self-lubrication and ensures the durability of maintaining a low coefficient of friction, it increases the cost. It is therefore preferable that the composition contains 3-5% by weight of BN.

As described above, according to the clutch disc of the present invention, a special plated coating is provided on at least the slidingly frictional engaging portion between the friction washer and the hub. Therefore, the coefficient of friction at the slidingly frictional engaging portion can be stabilized at a small value, and the wear resistance can be further improved. Also, the first-stage hysteresis torque in the torsional characteristic of the clutch disc can be stably maintained at a very small value over a long period of time.

In the aforementioned embodiment, the electroless plated Ni-P-BN coating was heat-treated at 500° C. for 1 hour as shown in Table 1. However, an equivalent hardness can be obtained with heat treatment at 300° C. for 1 hour, and, also, endurance test results similar to the on-stand torsional endurance test results shown in FIG. 4 can be obtained.

Further, in the aforementioned embodiment, the electroless plated Ni-P coating was provided on the hub 3, and the electroless plated Ni-P-BN coating was provided on the friction washer 11b and bush 14. However, an equivalent meritorious effect is obtained when, on the contrary, the electroless plated Ni-P coating is provided on the friction washer 11b and bush 14, and the electroless plated Ni-P-BN coating is provided on the hub 3.

Further, in the aforementioned embodiment, the plated coating compositions, plated coating thicknesses and plated coating hardnesses are shown as an example of the combination of the electroless plated Ni-P coating and the electroless plated Ni-P-BN coating. Depending on the conditions including the load imparted to the clutch disc and the number of durable uses, different plating coating compositions, plated coating thicknesses and plated coating hardnesses may be employed to achieve a meritorious effect equivalent to that exhibited by the aforementioned embodiment.

What is claimed is:

1. A spring type clutch disc including a hub member having an outer periphery and having a flange on its outer periphery, disc plates sandwiching the flange of said hub member therebetween, and at least one slide member interposed between one of said disc plates and said hub to make sliding contact with said hub, said disc plates and said hub being adapted for torque transmission therebetween, the torque transmission from said disc plates to said hub being effected through coil springs interposed therebetween, characterized in that an electroless plated Ni coating is provided on one of said slide member and said hub member, while an electroless plated Ni-P-BN coating is provided on the other of said members.

2. A spring type clutch disc as claimed in claim 1, characterized in that said slide member includes a friction washer interposed between said hub flange and said one disc plate, and a bush press-fitted on the inner peripheral surface of said one disc plate between said hub and said one disc plate.

3. A spring type clutch disc as claimed in claim 1, characterized in that said electroless plated Ni coating is selected from the group consisting of electroless plated Ni coating and electroless plated Ni-P coating.

4. A spring type clutch disc as claimed in claim 3, characterized in that said electroless plated Ni-P coating has a composition consisting of Ni: 90-92% by weight and P: 8-10% by weight.

5. A spring type clutch disc as claimed in claim 1, characterized in that said electroless plated Ni-P-BN coating has a composition consisting of Ni: 87-92% by weight, P: 5-8% by weight and BN: 3-5% by weight.

6. A spring type clutch disc as claimed in claim 3, characterized in that said electroless plated Ni-P coating is adopted and having a composition consisting of Ni: 98-92% by weight and P: 8-10% by weight, and said electroless plated Ni-P-BN coating has a composition consisting of Ni: 87-92% by weight, P: 5-8% by weight and BN: 3-5% by weight.

* * * * *

UNITED STATES PATENT OFFICE
CERTIFICATE OF CORRECTION

Patent No. 4,650,053　　　　　　　　Dated　March 17, 1987

Inventor(s) Katsuhiko Kayanoki, Kazuo Teramachi, Seigo Ono and Yasuyuki Hashimoto It is certified that error appears in the above-identified patent and that said Letters Patent are hereby corrected as shown below:

[73] Assignee: Mitsubishi Jidosha Kogyo Kabushiki Kaisha, Tokyo, Japan
Kabushiki Kaisha Daikin Seisakusho, Tokyo, Japan Signed and Sealed this Sixth Day of October, 1987

Attest:

DONALD J. QUIGG

*Attesting Officer*　　　　　　*Commissioner of Patents and Trademarks*